（12） United States Patent
Duerk et al.

(10) Patent No.: US 8,447,872 B2
(45) Date of Patent: May 21, 2013

(54) LOAD BALANCING IN A STORAGE SYSTEM

(75) Inventors: Vicky P. Duerk, Shrewsbury, MA (US);
Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 11/591,873

(22) Filed: Nov. 1, 2006

(65) Prior Publication Data

US 2008/0104264 A1    May 1, 2008

(51) Int. Cl.
*G06F 15/16* (2006.01)
*G06F 13/28* (2006.01)

(52) U.S. Cl.
USPC ............................ 709/230; 711/147; 710/300

(58) Field of Classification Search
USPC ................................................ 709/223, 220
See application file for complete search history.

(56) References Cited

U.S. PATENT DOCUMENTS

| | | | | |
|---|---|---|---|---|
| 5,469,571 | A * | 11/1995 | Bunnell | 718/103 |
| 6,768,716 | B1 * | 7/2004 | Abel et al. | 370/230 |
| 6,792,486 | B1 * | 9/2004 | Hanan et al. | 710/74 |
| 6,938,092 | B2 * | 8/2005 | Burns | 709/230 |
| 7,032,037 | B2 * | 4/2006 | Garnett et al. | 710/2 |
| 7,155,546 | B2 * | 12/2006 | Seto | 710/100 |
| 7,275,103 | B1 * | 9/2007 | Thrasher et al. | 709/224 |
| 7,694,009 | B2 * | 4/2010 | Shah et al. | 709/235 |
| 2003/0191795 | A1 * | 10/2003 | Bernardin et al. | 709/105 |
| 2004/0024853 | A1 * | 2/2004 | Cates et al. | 709/223 |
| 2004/0030770 | A1 * | 2/2004 | Pandya | 709/223 |
| 2005/0138202 | A1 * | 6/2005 | Seto | 709/238 |
| 2006/0085554 | A1 * | 4/2006 | Shah et al. | 709/235 |

FOREIGN PATENT DOCUMENTS

TW    558889 B    10/2003

OTHER PUBLICATIONS

"Serial ATA: High Speed Serialized AT Attachment," Revision 1.0a, published on Jan. 7, 2003 by the Serial ATA Working Group. Section 7 and Section 8. p. 129-235. Available at: http://www.t13.org/docs2003/e03104r0.pdf. Cite last visited Oct. 31, 2006.
Information Technology—Serial Attached SCSI—1.1, Working Draft American National Standard of International Committee for Information Technology Standards (INCITS) T10 Technical Committee, Project T10/1562-D, Revision 1, published Sep. 18, 2003, Section 7 and Section 9,.American National Standards Institute (ANSI).
Information Technology—Fibre Channel Protocol-3 (FBC-3)for SCSI, Tio Project 1560-D, Revision 4, Sep. 13, 2005.
Taiwanese Search Report received for Taiwanese Patent Application No. 096140550, completed on Apr. 19, 2011, 1 page of English Translation only.

* cited by examiner

*Primary Examiner* — Asad Nawaz
*Assistant Examiner* — Jason Harley
(74) *Attorney, Agent, or Firm* — Kacvinsky Daisak PLLC

(57) ABSTRACT

Link level load balancing is provided based on time utilization of a link or workload utilization of a device. Time utilization achieves load balancing by giving each device the same amount of connection time to perform Input/Output tasks. Workload utilization achieves load balancing by managing a number of frames or bytes transmitted to each device.

22 Claims, 10 Drawing Sheets

LOAD BALANCING IN A STORAGE SYSTEM

FIELD

This disclosure relates to storage systems and in particular to load balancing in a storage system.

BACKGROUND

Load balancing is a technique used for distributing processing and communications activity across a communications network to achieve optimum system performance.

Typically, in a storage system, a host bus adapter has a plurality of local ports through which storage devices may be accessed. Each local port in the host bus adapter may be associated with a communications channel and have an associated protocol engine and a task queue. The tasks assigned to a particular local port are queued in the task queue associated with the local port. A task may be assigned to a local port based on a number of outstanding tasks that have already been assigned to the local port, that is, the task assignment may be based on the depth of the task queue associated with the local port.

After a task has been assigned to a particular local port, it cannot be moved to another local port for the entire task execution time period unless the task is aborted. However, the amount of work to be performed by a task can vary, for example, a small task may only involve transferring several bytes over the communications channel and a large task may involve transferring thousands of bytes. Thus, load balancing at the task level merely provides a coarse load balancing technique A task based load balancing scheme does not work well for storage protocols that provide support for a plurality of communications channels to a single remote port, for example, a Serial attached Small Computer Systems Interface (SAS) wide port. Furthermore, task based load balancing does not work well for storage protocols that have shared common communications channel configurations such as a Port Multiplier that allows a HBA to communicate with more than one Serial Advanced Technology Attachment (SATA) device and the Fibre Channel-Arbitrated Loop (FC-AL).

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A method and apparatus according to an embodiment of the present invention provides link level load balancing in a storage system. Link level load balancing is provided by performing real-time link visibility of the link activities including idle status of the link, that is, by performing time multiplexing and frame/byte based load balancing. Communications may be distributed fairly across a plurality of links in the storage system to provide a fair share of link servicing to each of a plurality of remote ports sharing the plurality of links.

Embodiments of the invention may be used for a serial storage topology/configuration that uses Serial Attached Small Computer Systems Interface (SAS) wide port, Port Multiplier and Fibre Channel-Arbitrated Loop (FC-AL), etc.

Figure 1:
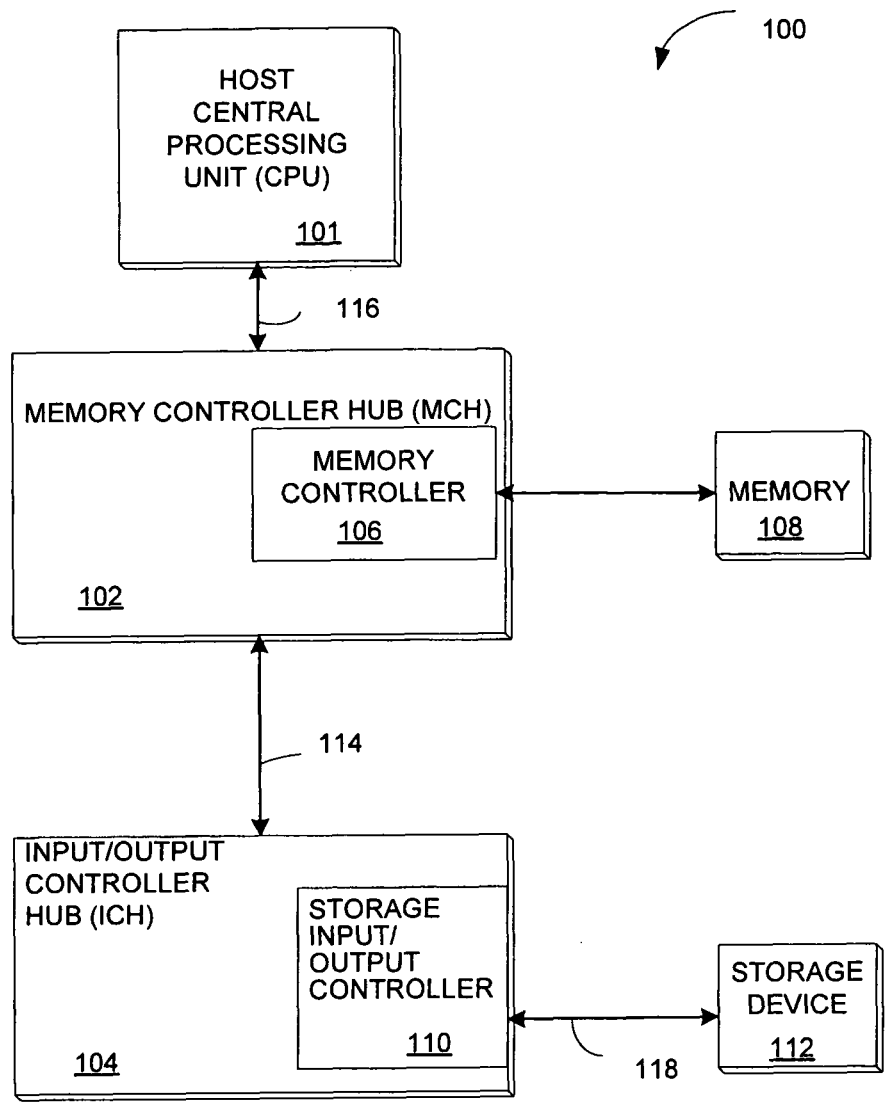
FIG. 1 is a block diagram of a system that includes an embodiment of a storage input/output (I/O) controller for performing link level load balancing according to the principles of the present invention.

FIG. 1 is a block diagram of a system 100 that includes an embodiment of a storage input/output (I/O) controller 110 for performing link level load balancing according to the principles of the present invention. The system 100 includes a host Central Processing Unit (CPU) 101, a Memory Controller Hub (MCH) 102 and an I/O Controller Hub (ICH) 104. The MCH 102 includes a memory controller 106 that controls communication between the CPU 101 and memory 108. The CPU 101 and MCH 102 communicate over a system bus 116.

The Host Central Processing Unit (CPU) 101 may be any one of a plurality of processors such as a single core Intel® Pentium IV® processor, a single core Intel Celeron processor, an ® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage I/O controller 110 performs link level load balancing.

The ICH 104 manages tasks to be processed by at least one storage device 112. The ICH 104 may receive task requests for the storage device 112 coupled to the ICH 104 from a device driver in an operating system that may be stored in memory 108. The ICH 104 processes each task request that it receives, stores a context associated with the task request together with the task request in a list of tasks and returns status of the task request when the task has been completed by the storage device 112.

The ICH 104 may communicate with the storage device 112 over a storage protocol interconnect 118 using a serial storage protocol. Commands, data and status information encapsulated in frames may be exchanged between the ICH 104 and the storage device 112, over the storage protocol interconnect 118 using standard serial attached storage protocol suites.

Typically, in a serial storage protocol, communication (data transfer) may be between an initiator and a target. The initiator may be a storage protocol controller such as a Host Bus Adapter (HBA) or storage I/O controller 110 and the target may be a storage device 112, for example, a disk drive, Digital Video Disk (DVD) drive, compact disk (CD) drive, Redundant Array of Independent Disks (RAID), tape drive or other storage device. A relationship between an initiator (I) and a target (T) is referred to as an I_T_Nexus.

There are many serial storage protocol suites such as, Serial Attached Small Computer System Interface (SAS) and Serial Advanced Technology Attachment (SATA). A version of the SATA protocol is described in "Serial ATA: High Speed Serialized AT Attachment," Revision 1.0a, published on Jan. 7, 2003 by the Serial ATA Working Group. A version of the SAS protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (ANSI). A version of the Fibre Channel (FC) protocol is described in the American National Standards Institute (ANSI) Standard Fibre Channel Physical and Signaling Interface-2 (FC-FS-2) Aug. 9, 2005 Specification.

Figure 2:
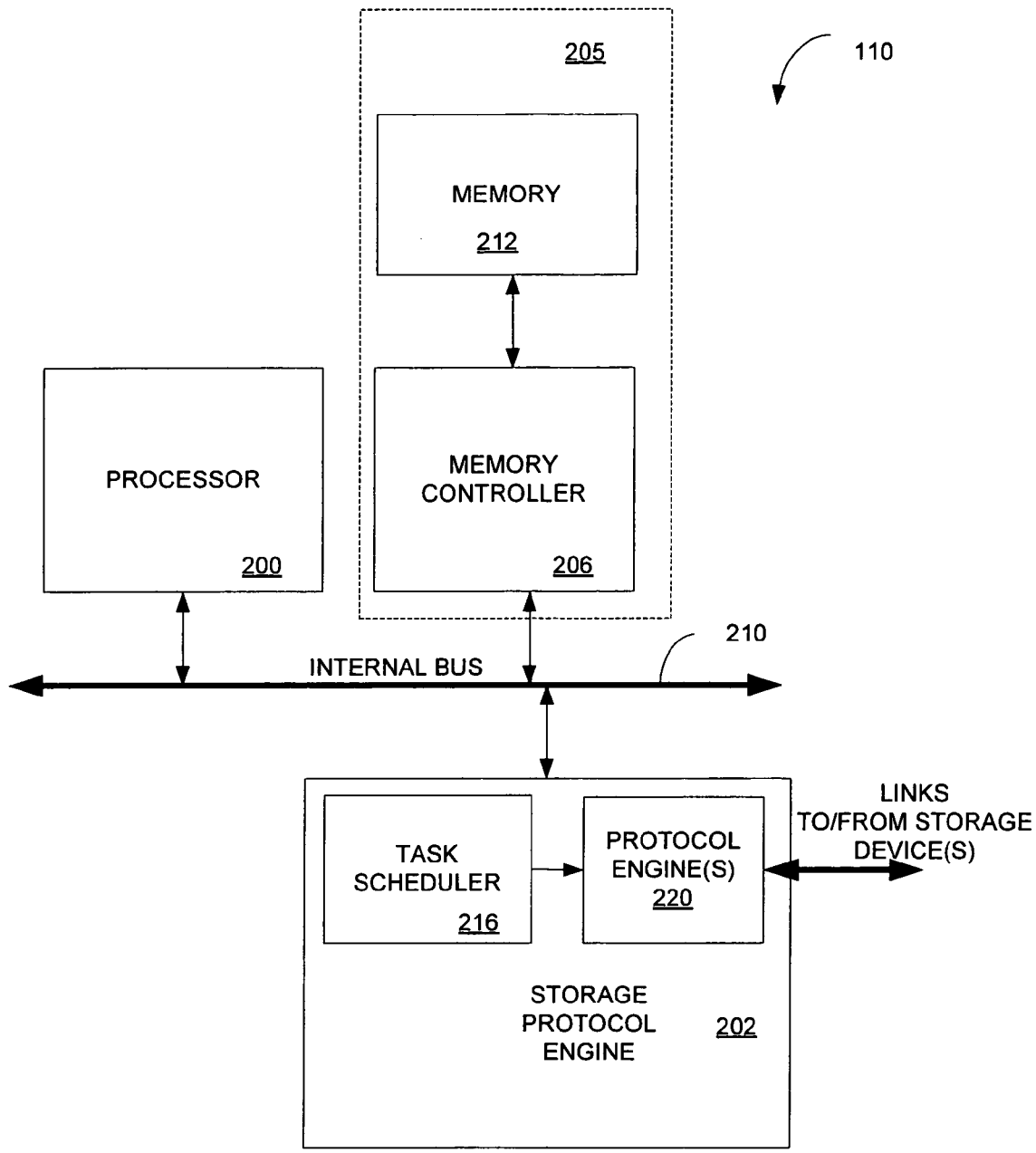
FIG. 2 is a block diagram of an embodiment of the storage input/output control unit shown in FIG. 1.

FIG. 2 is a block diagram of an embodiment of the storage I/O controller 110 shown in FIG. 1. The storage I/O controller 110 includes a processor (central processing unit (CPU) 200, a storage protocol engine 202 and a memory subsystem 205. The memory subsystem 205 includes a memory controller 206 and memory 212 that is accessible by the processor 200. In an embodiment, the memory 212 in the memory subsystem 205 may be Double Data Rate Synchronous Dynamic Random Access Ram (DDR SDRAM) and the processor 200 may be an Intel XScale® core. The processor 200 executes firmware, that is, software routines that are stored in memory 212 that is accessible by the processor 200.

The storage protocol engine 202 manages and manipulates data for a serial storage protocol such as SAS, Fibre Channel Protocol (FCP), Internet Small Computer Systems Interface (iSCSI) or SATA. In the embodiment shown, there is one storage protocol engine 202. However, in alternate embodiments the storage I/O controller 110 may have multiple storage protocol engines 202 with each storage protocol engine managing and manipulating data for a different serial storage protocol.

Some serial attached storage protocols provide a connection-orientated class of service between devices. Typically, in a serial attached storage protocol, a connection is established between an initiator and a target. The initiator may be a storage protocol controller such as a Host Bus Adapter (HBA) and the target may be a storage device, for example, a disk drive, Digital Video Disk (DVD) drive, compact disk (CD) drive, Redundant Array of Independent Disks (RAID), tape drive or any other type of storage device.

Connection based serial storage protocols such as serial attached SCSI (SAS), Fibre Channel Arbitrated Loop (FC-AL) and SCSI over Ethernet (iSCSI), transmit and receive frames inside a connection. A connection can be opened by either the initiator or the target and closed by either the initiator or the target.

After a connection is established between an initiator and a target, command, data and status information encapsulated in frames are exchanged between the initiator and the target. A frame is a package of information transmitted as a single unit. Every frame follows the same basic organization and contains control information and an error-checking value, as well as a variable amount of data. The format of the frame and encapsulated information is defined by the protocol suite.

A layer is a protocol or protocols operating at a particular level within a protocol stack. The serial storage protocol suite defines a plurality of layers that may include a physical layer, a link layer, a transport layer and other layers. Information is passed between layers, with a dword being the basic unit of information. Each layer is responsible for providing specific services or functions for exchanging information over a communications network. Although different protocol suites have varying numbers of layers, generally the highest layer (application layer) handles software interactions at the application level, and the lowest layer (physical layer) governs link-level interconnects.

The physical layer defines the physical (link-level) interface which provides the physical interface through which data is transferred. The phy layer defines the framing protocol and includes link level function interfaces to aid in managing link operations, error handling and may be look ahead flow control. The transport layer performs protocol mappings between upper layers and the lower levels (physical layers).

One upper layer protocol is the Small Computer System Interface (SCSI) protocol that defines the exchange of commands and data between an initiator and a target. A task is mapped into a plurality of phases that may include a command phase, a data phase and a status phase. A command to be executed by a target may be transmitted from an initiator to a target in a Command Descriptor Block (CDB) in the command phase. Data is transmitted between the target and the initiator during the data phase and command completion information is transmitted from the target to the initiator during the status phase.

The storage protocol engine 202 may include one or more protocol engines 220 and a task scheduler 216. In one embodiment each protocol engine 220 may include a transport layer (TL) and a link layer (LL) pair for managing communications for a single physical link between the storage protocol engine 202 and a remote node. The task scheduler 216 may schedule tasks to a protocol engine 220 to be executed by the transport layer, post status of a task when the task is complete, perform wide port management, and manage task timeout, and task abortion.

Figure 3:
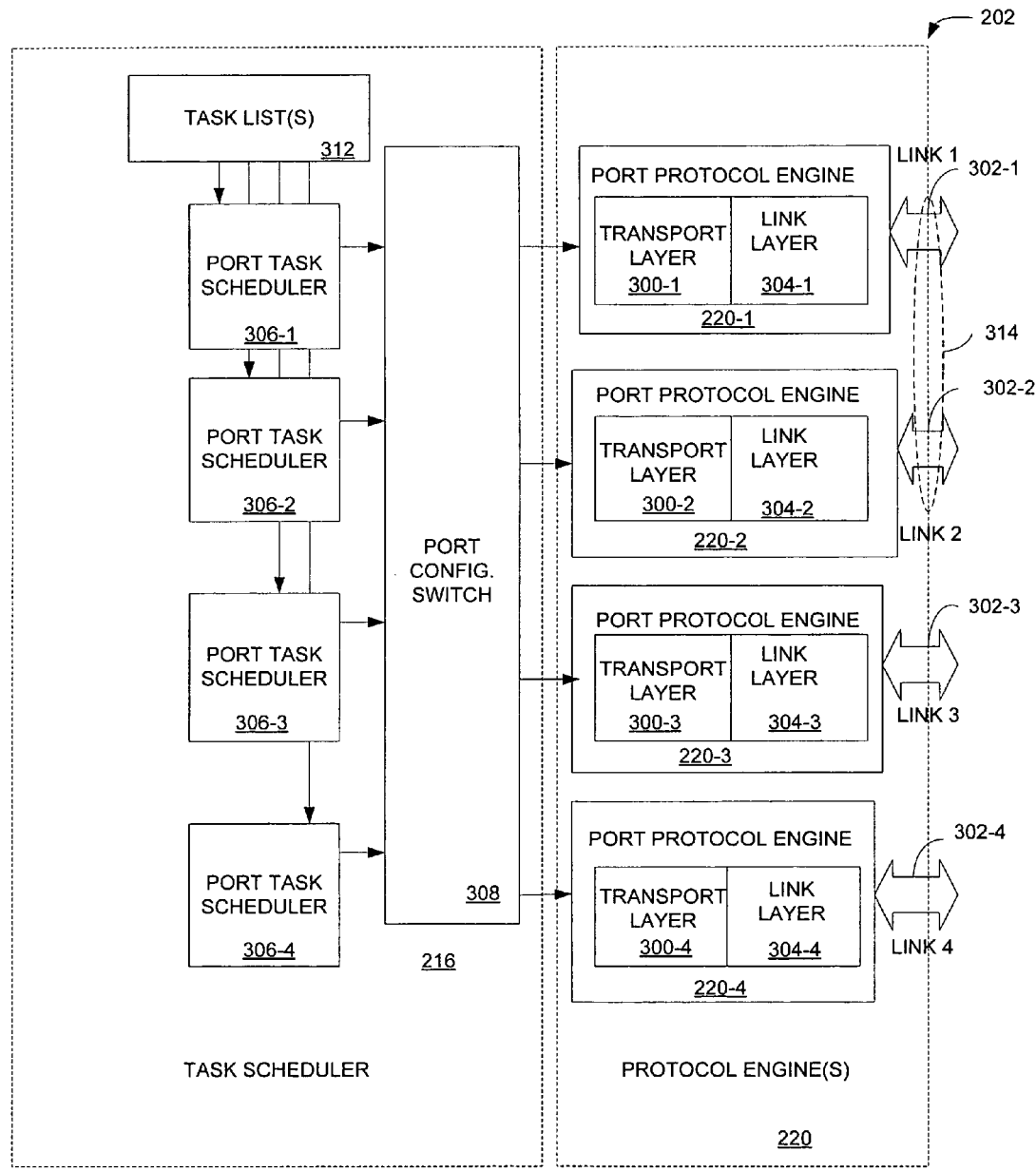
FIG. 3 is a block diagram of an embodiment of the storage input/output control unit shown in FIG. 1 that includes four Serial Attached Small Computer Systems Interface (SAS) physical links.

FIG. 3 is a block diagram of an embodiment of the storage protocol engine 202 shown in FIG. 2 that includes four SAS physical links 302-1, 302-2, 302-3, and 302-4. A SAS physical link 302-1, 302-2, 302-3, 302-4 includes two differential signal pairs (four separate wires). One differential pair transmits in one direction while the other differential pair transmits in the opposite direction. A SAS phy (physical layer) includes a transceiver which electrically interfaces to a SAS physical link 302-1, 302-4 and may be coupled to another SAS phy in a remote device.

Each SAS physical link 302-1, 302-4 may be configured as a SAS narrow port or as part of a SAS wide port. A SAS narrow port contains exactly one phy. A SAS wide port includes more than one phy. Each SAS physical link 302-1, 302-2, 302-3, 302-4 has an associated SAS port protocol engine 220-1, 220-2, 220-3, 220-4 that includes a respective transport layer (TL) 300-1, 300-2, 300-3, 300-4 and link layer (LL) 304-1, 304-2, 304-3, 304-4. As a SAS port may have one or more phys, each phy is identified by a SAS address inherited from the SAS port and a phy identifier within the SAS port.

In the embodiment shown in FIG. 2, the task scheduler 216 coupled to the protocol engines 220 includes four port task schedulers 306-1, 306-2, 306-3, 306-4, with one port task scheduler for each of the four possible narrow SAS ports on each of the four physical links 302-1, 302-2, 302-3, 302-4. In other embodiments, there may be more or less narrow SAS ports and physical links. The task scheduler 216 manages task assignments to all of the port protocol engines 220-1, 220-2, 220-3, 220-4. The task scheduler 216 also includes a port configuration switch 308 and a task list(s) 312.

Each port task scheduler has respective task lists and may share the same task list memory. One or more of the port task schedulers may be disabled dependent on the selected port configuration. For example, all port task schedulers are enabled if the ports are configured as four narrow ports but only one port task scheduler is enabled if all four ports are configured as one wide port. Any combination of wide/narrow ports may be configured, with unused port task schedulers being disabled. In a system having SAS ports, a driver in the operating system may configure the task scheduler 216 for a particular port configuration by performing a link reset sequence and processing inbound identify address frames from the storage devices.

A task is a job issued by a device driver in the operating system to request some amount of work described by associated task context information to be performed. For example, the task may be an IO read, a Write Data Transfer or a Send Primitive Sequence. The task list(s) includes information used by a port task scheduler 306-1, 306-2, 306-3, 306-4 for task scheduling. The task list(s) 312 may be used by the port task schedulers 306-1, 306-2, 306-3, 306-4 to store task schedule contexts associated with tasks.

The port task schedulers 306-1, 306-2, 306-3, 306-4 schedule tasks to the port protocol engines 220-1, 220-2, 220-3, 220-4 of the configured ports. Dependent on the configuration of narrow ports and wide ports, some of the port task schedulers 306-1, 306-2, 306-3, 306-4 may be unused and disabled.

One port task scheduler 306-1, 306-2, 306-3, 306-4 is assigned per SAS port (narrow or wide). Thus, each port task scheduler 306-1, 306-2, 306-3, 306-4 may be configured to service only one physical link (narrow port) or multiple physical links (wide port). For example, in the embodiment shown, physical links 302-1, 302-2 are configured to be within one wide port 314 and physical links 302-3, 302-4 are each configured to be within a respective narrow port. Thus, port task scheduler 306-1 is assigned to interface with both physical links 302-1, 302-2; port task scheduler 306-2 is disabled; port task scheduler 306-3 is assigned to interface with physical link 302-3; and port task scheduler 306-4 is assigned to interface with physical link 302-4.

The port configuration switch 308 is coupled between the port task schedulers 306-1, 306-2, 306-3, 306-4 and the port protocol engines 220-1, 220-2, 220-3, 220-4. Prior to routing requests using the SAS protocol suite to a particular port, a SAS connection, that is, a temporary association between a local SAS initiator port and a SAS target port is established. The configuration switch 308 may route requests from each of the port task schedulers 306-1, 306-2, 306-3, 306-4 to the corresponding port protocol engine 220-1, 220-2, 220-3, 220-4 for a particular SAS connection.

A remote node may be coupled to the storage protocol engine 202 through any of the physical links 302-1, 302-2, 302-3, 302-4 and may be a Serial SCSI Protocol (SSP) initiator, an SSP target, an expander, an Serial Management Protocol (SMP) initiator, an SMP target, a Serial Advanced Technology Attachment Tunneled Protocol (STP) target or a Serial Advanced Technology Attachment (SATA) device.

In one embodiment, link load balancing, that is, the maximum connection time on each connection or across a wide port per remote node is managed by the link layer (LL) on a per connection per link basis. In contrast to scheduling on an I/O task basis, tasks are scheduled so as to provide a fair share of link servicing to each remote (storage) device. In one embodiment the fair share of link servicing is time based. In another embodiment, the fair share of link servicing is frame based, for example, based on the number of bytes transferred.

Figure 4:
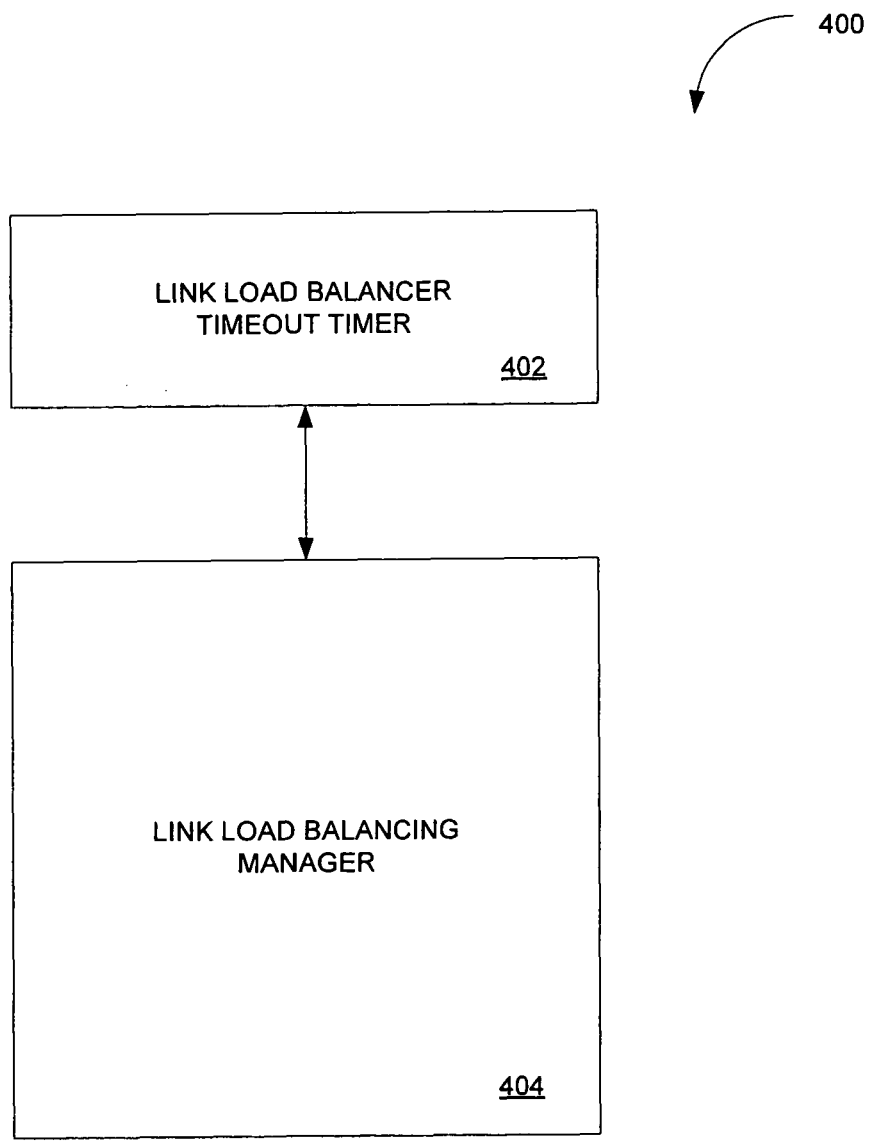
FIG. 4 is a block diagram of an embodiment of a load balancer that may be included in the link layer shown in FIG. 3.

FIG. 4 is a block diagram of an embodiment of a load balancer 400 that may be included in the link layer 304-1 . . . 304-4 shown in FIG. 3. Referring to FIG. 3, the respective port task scheduler 306-1 . . . 306-4 may pass task information to the respective link layer 304-1 . . . 304-4.

Returning to FIG. 4, the load balancer 400 includes a link load balancing manager 404 that schedules link servicing on a time basis. The load balancer 400 enables a load balance timeout timer 402 to start incrementing when a connection is established between the local port and a remote port over the physical link 302-1 . . . 302-4. When the load balance timeout timer 402 reaches its programmable timeout value, the link load balancing manager 404 informs the link 302-1 . . . 302-4 to close the connection and resets the load balancing timeout timer 402 when the connection is closed.

An embodiment has been described in which the load balancer 400 is included in the link layer 304-1 . . . 304-4 in the port protocol engine 220-1 . . . 220-4 associated with each physical link 302-1 . . . 302-4. In another embodiment, the load balancer 400 may be included in the port task scheduler 306-1 . . . 306-4. In this embodiment, the connection information is passed from the link layer 304-1 . . . 304-4 to the respective port task scheduler 306-1, . . . 306-4. As the port task scheduler 306-1, . . . 306-4 maintains all of the tasks that need to be scheduled, the port task scheduler 306-1, . . . 306-4 knows if there are any queued tasks to other devices (ports/links). Thus, the port task scheduler 306-1, . . . 306-4 may leave the connection open, even after the load balancing timeout timer expires, if there are no other pending tasks.

If the load balancing timeout timer expires in the middle of a task, for example, while data for a write I/O is being transferred to the remote device, the partially completed task is returned to the task list(s) and re-scheduled by the port task schedulers 306-1 . . . 306-4.

In a SAS wide port configuration, the physical links that belong to the same SAS address form a single wide port. There may be multiple connections to a remote device within the wide port. If two connections are opened using two physical links within the wide port, the bandwidth to the remote device may be doubled. In a wide port with four physical links each having a connection open to the same remote device, that is, a x4 port, the bandwidth to the remote device may be quadrupled.

Figure 5:
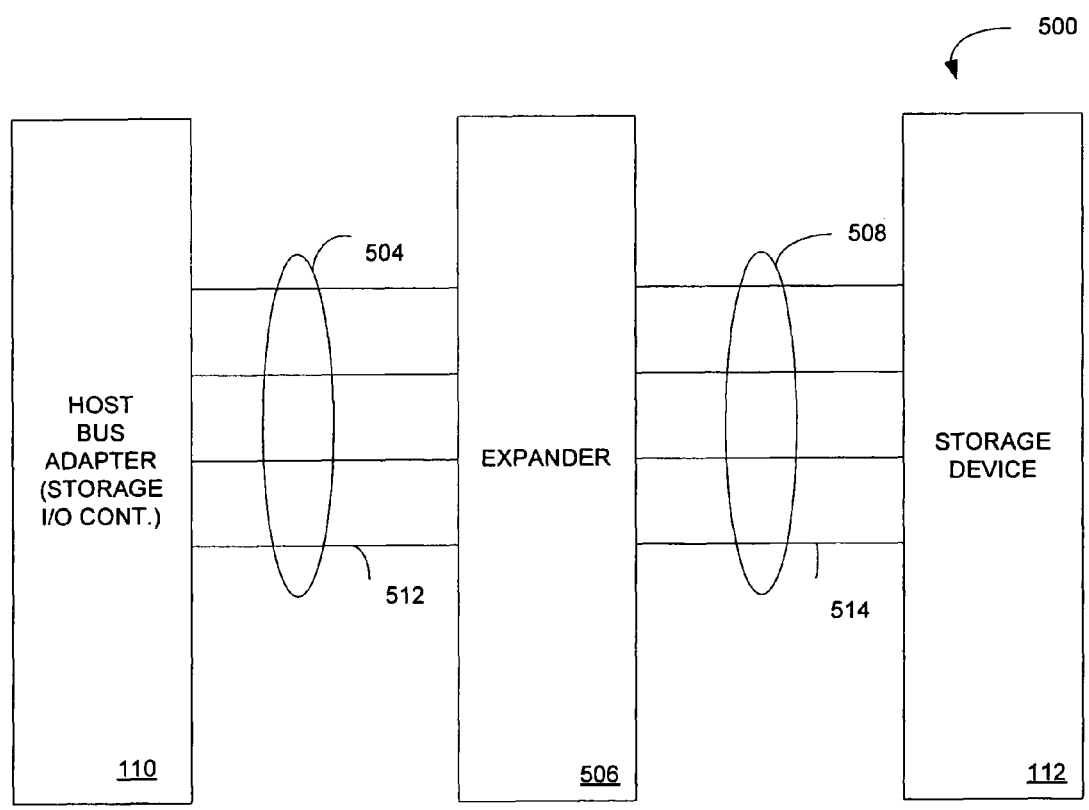
FIG. 5 is a block diagram of an embodiment of a storage system that includes a Host Bus Adapter (HBA) having a wide port coupled to an expander which includes a wide port coupled to a target device.

FIG. 5 is a block diagram of an embodiment of a storage system 500 that includes a Host Bus Adapter (HBA) 110 having a wide port 504 coupled to an expander 506 which includes a wide port 508 coupled to a storage (remote) device 112. The wide port 504 between the HBA 110 and the expander 506 includes four physical links 512. The wide port 508 between the expander 506 and the target device also includes four physical links 514.

If the time to complete tasks is x on a narrow port (one physical link 512, 514), it may take x/4 to complete the same work (one or more tasks) on an x4 wide port 504, 508. However, if the same timeout value is used in the link load balance timeout timer 402 (FIG. 4) for each physical link (512, 514) irrespective as to whether the physical link (512, 514) is configured as part of a wide port (504, 506), fair share load balancing between ports is not achieved. Thus, in order to provide fair share load balancing, the timeout value for each link (512, 514) in a wide port is added and the result compared with a load balance timeout value for the wide port to provide a fairer distribution of load between the ports (wide and narrow).

Figure 6:
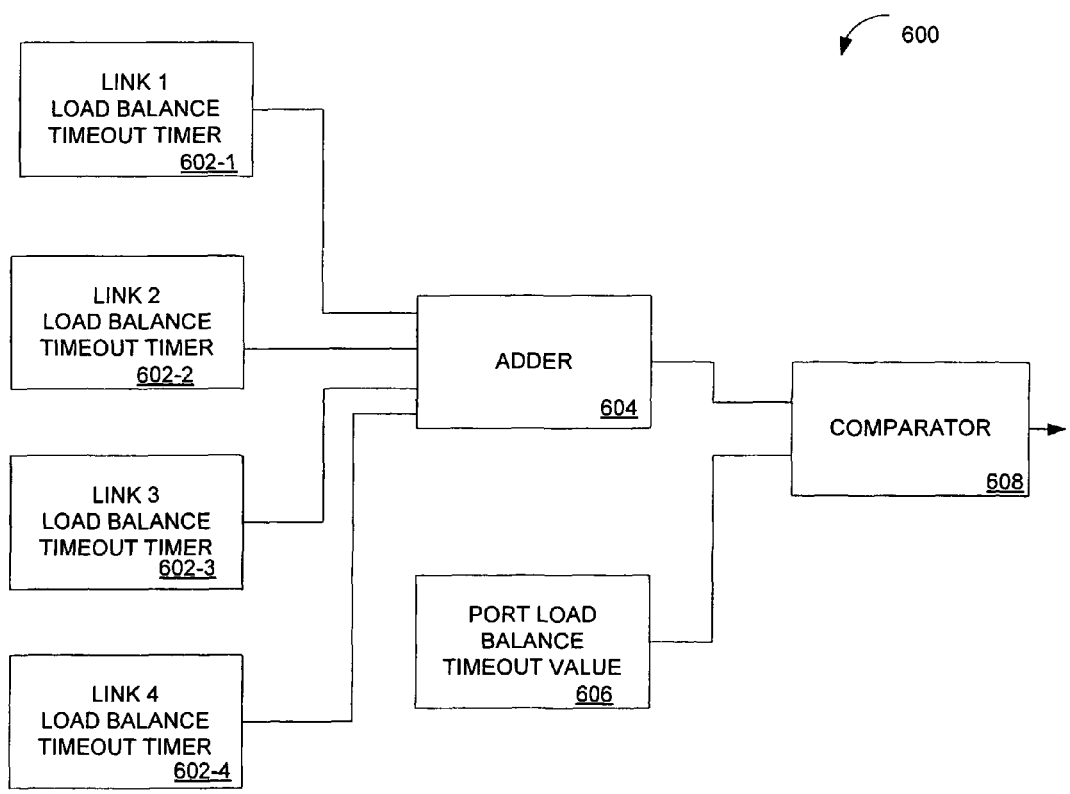
FIG. 6 is a block diagram of an embodiment of load balancing logic for a wide port.

FIG. 6 is a block diagram of an embodiment of a load balancer 600 for a wide port 600. In the embodiment of the load balancer 400 for one link layer discussed in conjunction with FIG. 4, there is one link load balancer timeout timer 402 per link layer. In the x4 wide port embodiment shown in FIG. 6, there is one port task scheduler 306-1, ... 306-4 associated with the four phys (links) 302-1, ... 302-4. Instead of having a load balancer 400 in each link layer 304-1 ... 304-4 as discussed in conjunction with the embodiment shown in FIG. 4, the load balancer 600 shown in FIG. 6 is included in the port task scheduler 306-1, ... 306-4. The outputs of the respective load balance timeout timer 602-1, ... 602-4 for each link layer 602-1 ... 602-4 are combined in an adder 604 and compared by a comparator 608 with the load balance timeout value for the wide port 606.

Thus, if a remote device has multiple connections through a wide port, the load balance timeout timer times out earlier than if the remote device has one connection through a narrow port. By combining the outputs of the load balance timeout timers 802-1, ... 802-4 for all links (phys) in the wide port, the communications bandwidth used per device may be determined allowing the communications bandwidth to be distributed fairly amongst all the devices irrespective of the width of each remote device's communication port (narrow or wide). However, a wide port between a HBA and an expander does not necessarily imply that all of the physical links between the HBA and the expander are used to communicate with the same remote device.

Figure 7:
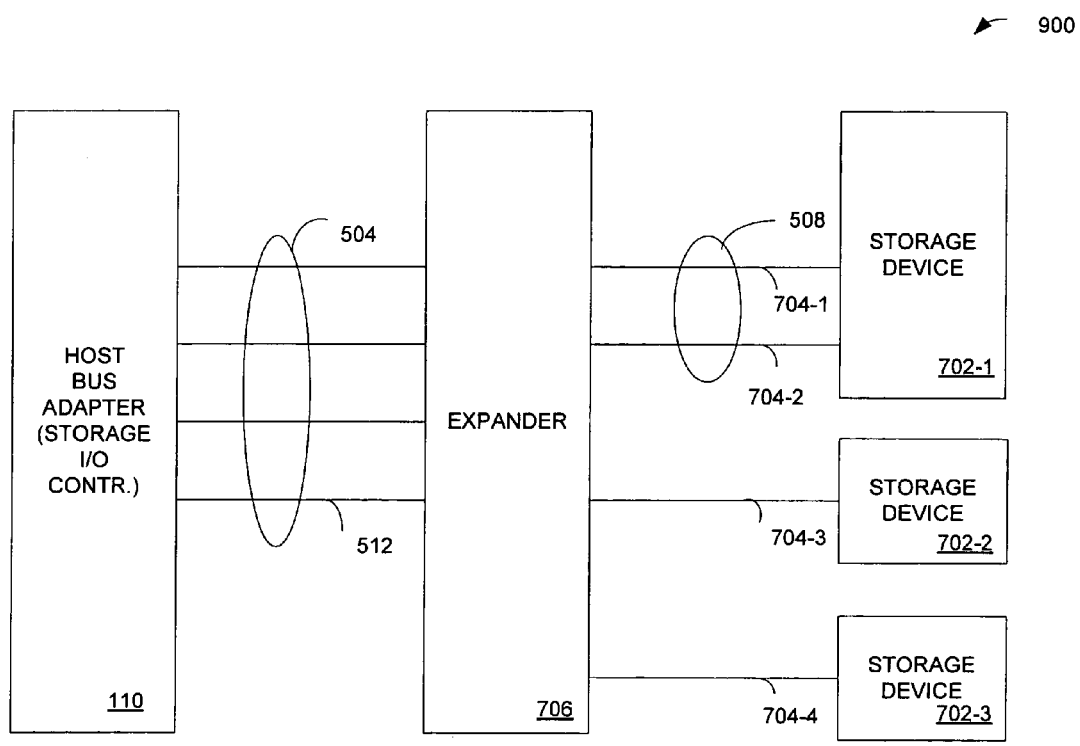
FIG. 7 is a block diagram of an embodiment of a storage system that includes a Host Bus Adapter with an x4 wide port coupled to an expander that communicates with three different target devices at the other side of the expander.

FIG. 7 is a block diagram of an embodiment of a storage system 700 that includes a Host Bus Adapter 110 with an x4 wide port 504 coupled to an expander 506 that communicates through the expander 506 with three different remote devices 702-1, 702-2, 702-3.

In the embodiment shown, links 704-1, 704-2 may be used to communicate with remote device 702-1, link 704-3 may be used to communicate with remote device 702-2 and link 704-4 may be used to communicate with remote device 704-4. If all of the load balance timeout timer values are added together, as discussed in conjunction with the embodiment shown in FIG. 5, remote device 704-3 and remote device 704-4 will not receive a fair share of the communications bandwidth.

Thus, to ensure fair distribution of the communications bandwidth in the embodiment shown in FIG. 7, the port task scheduler which has the wide port configuration information for all of the links 704-1, ... 704-4 may initialize the load balance timeout timers 602-1, ... 602-4 for all of the links 704-1, ... 704-4 so that the timeout timer values for links 704-1 and 704-2 are combined and individual timeout timer values are used for links 704-3 and 704-4.

Time multiplexing achieves load balancing by giving each remote device a fair share of the connection time. During the configurable amount of connection time, a number of I/O tasks may be executed. The number of I/O tasks is dependent on the length of each task. By limiting the connection time to each remote device, an extremely long I/O task to one remote device will not hog the communications link and prevent the use of the communication link by other devices.

For example, I/O tasks A, B and C may be time multiplexed on a link by transmitting a frame for task A, a frame for task B, a frame for task C, then repeating the sequence starting with the next sequential frame for task A.

In another embodiment instead of using time multiplexing to perform load balancing, fair distribution of communication bandwidth is provided by keeping track of the amount of data transferred over each link in a connection to the remote device. This may be referred to as frame/byte load balancing because it involves counting frames or bytes transmitted and/or received through a particular link in a connection to a device. In this embodiment, the link load balance timeout timer 402 discussed in conjunction with FIG. 4 counts the number of frames or bytes transferred over a link instead of the time that the connection has been open. One advantage to counting frames/bytes instead of time is that the link load balance timer timeout only increments (decrements) while the link is actively transferring data giving the device time to perform other work while frames/bytes are not being transferred across the link.

The ability to stop the link load balance timeout timer while the link is idle is an advantage in frame level multiplexing configurations such as Port Multiplier or Fibre channel Fabric Switch configuration. However, it is a disadvantage in a connection oriented configuration such as SAS because the link may be hogged by a connection to a remote device even while there is no work to be performed for the connection. When a connection is established between a host bus adapter and the storage device in a connection oriented environment, for example, SAS, the host bus adapter is given exclusive access to the storage device until the current connection is closed Point-to-point storage protocols such as the Serial Advanced Technology Attachment (SATA) protocol support one active communication between a storage device and a host bus adaptor at a time. Devices are either directly attached to the Host Bus Adaptor or to a Port Multiplier (PM). When a Port Multiplier is used, "virtual" connections are made.

Figure 8:
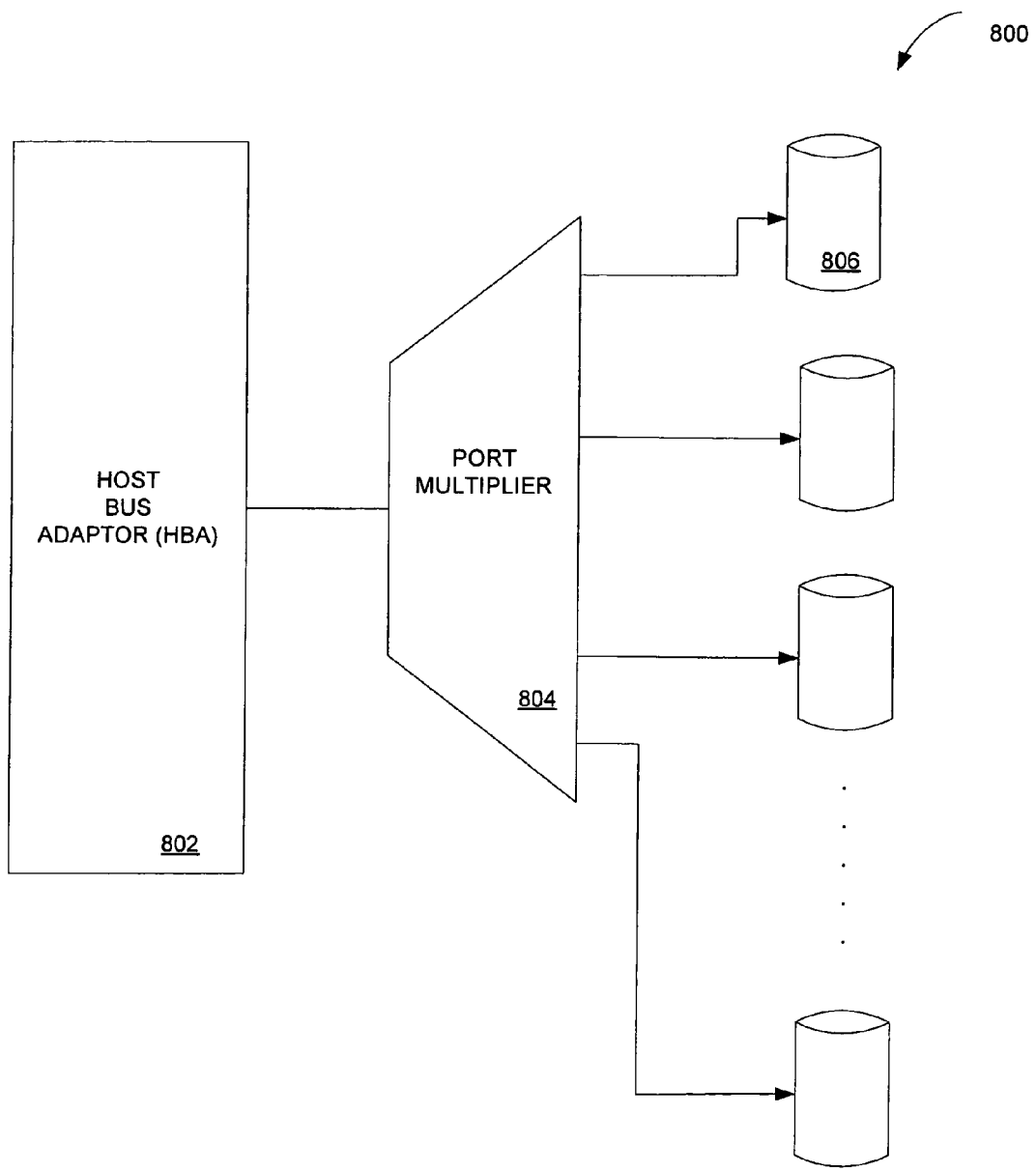
FIG. 8 is a block diagram of an embodiment of load balancing in a direct attached SATA system.

FIG. 8 is a block diagram of an embodiment of a direct attached SATA system 800 that performs load balancing according to the principles of the present invention. In the embodiment shown, a HBA 802 is directly connected to a port multiplier 804 and the port multiplier 804 may be directly connected to up to 15 different SATA devices 806. A SATA device 806 may be a disk drive, flash card, compact disk (CD) drive, digital video disk (DVD) drive or tape drive.

The HBA 802 may communicate with each SATA device 806 through the port multiplier 804. There is no connection management involved, however the communication channel from the HBA 802 to the SATA devices 806 may be considered to be up to 15 separate virtual connections.

As there is no connection management, link-level load balancing may be performed through the use of frame level interleaving. In one embodiment, the HBA 802 transmits in round-robin order a configurable number of frames starting with the first device until the last device has received the configurable number of frames.

This frame level interleaving described for the SATA system 800 shown in FIG. 8 may also be used in a system that includes a Fibre Channel Fabric Switch configuration.

Figure 9:
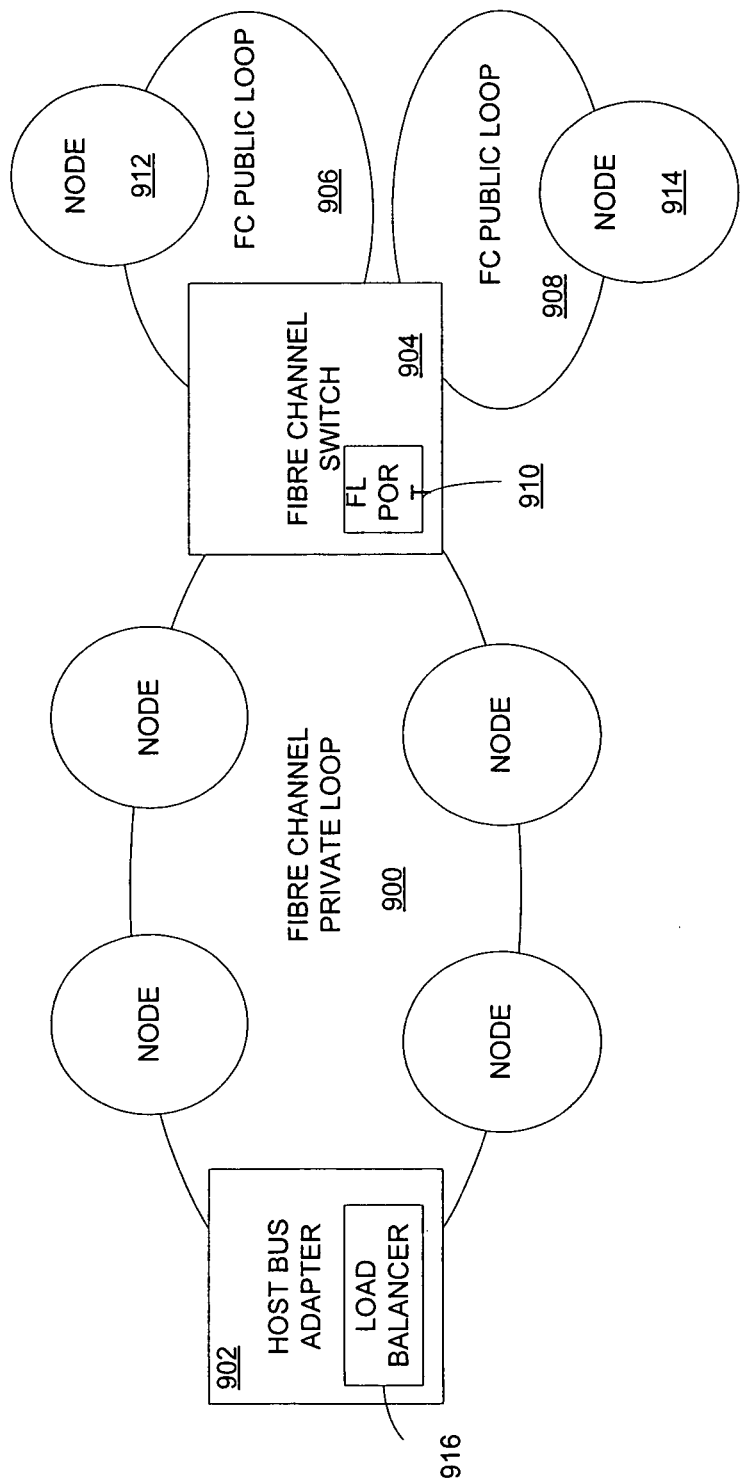
FIG. 9 is a block diagram of an embodiment of a Fibre Channel-Arbitrated Loop including a Host Bus Adapter and a Fibre Channel Switch.

FIG. 9 is a block diagram of an embodiment of a Fibre Channel Arbitrated Loop (FC-AL) 900 that includes a Host Bus Adapter (HBA) 902 and a Fibre Channel (FC) switch 904. The FC switch 904 provides access to remote devices 912, 914 on Fibre Channel public loops 906, 908. The Host Bus Adapter 902 may access remote devices 912, 914 on a Fibre Channel Public loop 906, 908 through a Fibre Channel Loop port (FL port) 910 having an associated Fibre Channel port address in the Fibre Channel switch 904.

In the embodiment shown, as all of the remote devices 912, 914 on the Fibre channel public loops 906, 908 are accessed through the same FL port address; there is a single connection to the FL port 910 for all remote devices 912, 914 on the Fibre Channel public loops 906, 908. The HBA 902 only opens a single connection with the Fibre Channel loop port even if it is communicating with multiple target devices in the pubic domain (Fibre channel public loops). Thus, the HBA 902 cannot use connection establishment discussed in conjunction with the SAS embodiment to provide load balancing to remote devices 912, 914 coupled to the Fibre Channel public loops 906, 908.

In this embodiment, a hybrid load balancing scheme may be used to provide load balancing to all of the devices accessible by the HBA 902. The devices accessible by the HBA 902 include public devices (devices on the public loops 906, 908) and private devices (devices on the FC-AL loop 900).

Instead of closing the connection to the FL port when a connection to a remote device 912, 914 on a Fibre Channel public loop 906, 908 is closed, the connection to the FL port 910 is kept open and the load balancer 916 in the HBA 902 switches among different devices accessible through the FL port 910. This eliminates overhead to unnecessarily open/close connections and achieves load balancing among devices behind the shared connection channel, that is, behind the FL port 910.

The HBA 902 may use connection oriented load balancing to provide a fair share of link servicing to local devices and public devices. In an embodiment in which the number of public devices is much higher than the number of local devices, the connection time for the public devices connection may be increased appropriately to provide a fair share of link servicing between public and private devices. The public connection may use time domain multiplexing to provide a fair share of link servicing to the selected public devices. By first assigning a connection time to the public connection and then using time domain multiplexing within the assigned public connection. The hybrid load balancing scheme allows the system to achieve true load balancing for all private and public devices.

For example, within the same private loop (FC-AL) connections are made to each device within the private loop. A connection is made through the FL_Port to all the public devices with time-based connection multiplexing. The public devices are multiplexed using frame based multiplexing within that particular connection.

The hybrid load balancing scheme may also be used in a SAS and SATA configuration that includes an expander as shown in FIGS. 5 and 7. In an embodiment in which the HBA is coupled to an expander with a wide port configuration, some devices may be coupled to the expander directly and some SATA devices may be attached to a Port Multiplier and then coupled to the expander. Load balancing for devices attached directly to the expander is performed using time based connection multiplexing but for devices attached behind the Port Multiplier that is attached to the expander load balancing is performed based on frame based multiplexing thru the port multiplier.

Figure 10:
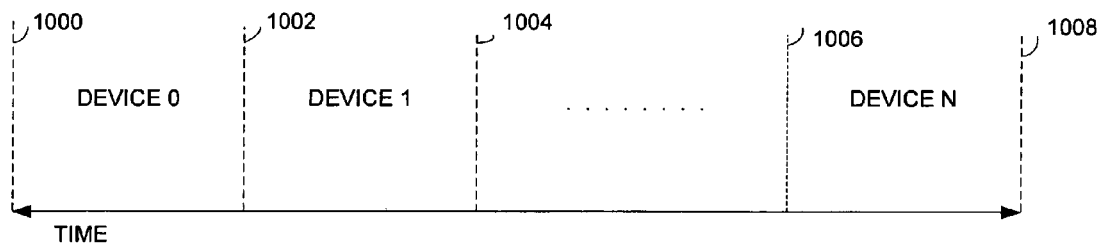
FIG. 10 is a timing diagram illustrating an embodiment that uses time domain multiplexing to provide load balancing.

FIG. 10 is a timing diagram illustrating an embodiment that uses time domain multiplexing to provide load balancing.

At time 1000, the load balance timeout timer starts and the shared communication channel may be used by device 0 until time 1002.

At time 1002, the load balance timeout timer times out and is re-started. The shared communication channel may be used by device 1 until time 1004.

At time 1004, the load balance timeout timer times out and is re-started. The shared communications channel may be used by the next device.

At time 1006, the load balance timeout timer times out and is restarted. The shared communications channel may be used by the last device until time 1008.

Thus, through the use of time domain multiplexing each device receives a fair share of the shared communications channel.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

What is claimed is:

1. An apparatus comprising:
a port task scheduler to maintain a list of tasks associated with a remote storage device each task involving a data transfer using a serial storage protocol between a local initiator port in a storage Input/Output controller and the remote storage device over at least one of a plurality of physical links, the port task scheduler to include a load balancer to schedule tasks from among the list of tasks by scheduling the data transfer over at least one of the plurality of physical links associated with a connection established between the remote storage device and the local initiator port, the load balancer to provide a fair share of link servicing to each of a plurality of remote storage devices sharing the plurality of physical links such that each remote storage device receives a fair share of communication bandwidth, the load balancer to maintain a load balancing timeout timer associated with a connection established between the remote storage device and the local initiator port, the load balancer to count frames transferred over the connection and decrement the load balancing timeout timer only while frames are being transferred over the connection, the load balancer to cause the connection to be closed when the load balancing timeout timer expires, the load balancer to return a partially completed task to the list of tasks when the load balancing timeout timer expires and there are pending tasks in the list of tasks, the partially completed task to be re-scheduled by the load balancer.

2. The apparatus of claim 1, wherein the remote storage device communicates over a link using a connection oriented protocol.

3. The apparatus of claim 2, wherein the connection oriented protocol is Serial Attached Small Computer System Interface.

4. The apparatus of claim 1, wherein the remote storage device communicates over the link using a non-connection oriented protocol.

5. The apparatus of claim 4, wherein the fair share of link servicing is frame based.

6. The apparatus of claim 5, wherein the non-connection oriented protocol is Fibre Channel.

7. The apparatus of claim 5, wherein the non-connection oriented protocol is Serial Advanced Technology Attachment (SATA).

8. The apparatus of claim 1, wherein at least two of the links are configured as a wide port to transfer data between the local port and the remote storage device.

9. The apparatus of claim 1, the load balancer to cause the connection to be closed based on whether the load balancing timeout timer expires or whether a count of frames transferred over the connection before the timer expires exceeds a threshold count, the load balancer to return a partially completed task to the list of tasks when the connection is closed and there are pending tasks in the list of tasks, the partially completed task to be re-scheduled by the load balancer.

10. A method comprising:
   storing, by a storage controller, a list of tasks associated with a remote storage device each task involving a data transfer using a serial storage protocol between a local initiator port in the storage controller and the remote storage device over at least one of a plurality of physical links; and
   scheduling tasks, by the storage controller, the storage controller scheduling the data transfer over at least one of the plurality of physical links associated with a connection established between the remote device and the local initiator port, the storage controller to provide a fair share of link servicing to each of a plurality of remote storage devices sharing the plurality of physical links such that each remote storage device receives a fair share of communication bandwidth, the storage controller to maintain a load balancing timeout timer associated with a connection established between the remote storage device the local initiator port, the storage controller to count frames transferred over the connection and decrement the load balancing timeout timer only while frames are being transferred over the connection, the storage controller to close the connection when the load balancing timeout timer expires, the storage controller to return a partially completed task to the list of tasks when the load balancing timeout timer expires and there are pending tasks in the list of tasks, the partially completed task to be re-scheduled by the storage controller.

11. The method of claim 10, wherein the remote storage device communicates over the link using a connection oriented protocol.

12. The method of claim 11, wherein the connection oriented protocol is Serial Attached Small Computer System Interface.

13. The method of claim 10, wherein the remote storage device communicates over the link using a non-connection oriented protocol.

14. The method of claim 13, wherein the fair share of link servicing is frame based.

15. The method of claim 14, wherein the non-connection oriented protocol is Fibre Channel.

16. The method of claim 14, wherein the non-connection oriented protocol is Serial Advanced Technology Attachment (SATA).

17. The method of claim 10, wherein at least two of the links are configured as a wide port to transfer data between the local port and the remote port.

18. The method of claim 10, the storage controller to close the connection either when the load balancing timeout timer expires or when a count of frames transferred over the connection before the timer expires exceeds a threshold count, the storage controller to return a partially completed task to the list of tasks when the connection is closed and there are pending tasks in the list of tasks, the partially completed task to be re-scheduled by the storage controller.

19. A computer usable non-transitory medium including a computer readable code stored thereon having associated information, wherein the information, when accessed, results in a storage controller performing:
   storing a list of tasks associated with a remote storage device, each task involving a data transfer using a serial storage protocol between a local initiator port and the remote storage device over at least one of a plurality of physical links; and
   scheduling tasks by scheduling the data transfer over at least one of the plurality of physical links associated with a connection established between the remote device and the local initiator port, to provide a fair share of link servicing to each of a plurality of remote ports sharing the plurality of physical links such that each remote storage device receives a fair share of communication bandwidth, the storage controller to maintain a load balancing timeout timer associated with a connection established between the remote storage device and the local initiator port, the storage controller to count frames transferred over the connection and decrement the load balancing timeout timer only while frames are being transferred over the connection, the storage controller to close the connection when the load balancing timeout timer expires, the storage controller to return a partially completed task to the list of tasks when the load balancing timeout timer expires and there are pending tasks in the list of tasks, the partially completed task to be re-scheduled by the storage controller.

20. The computer usable medium of claim 19, the storage controller to close the connection either when the load balancing timeout timer expires or when a count of frames transferred over the connection before the timer expires exceeds a threshold count, the storage controller to return a partially completed task to the list of tasks when the connection is closed and there are pending tasks in the list of tasks, the partially completed task to be re-scheduled by the storage controller.

21. A system comprising:
   a disk drive; and
   a storage I/O controller comprising:
      a port task scheduler to maintain a list of tasks associated with a remote storage device each task involving a data transfer using a serial storage protocol between a local initiator port in a storage Input/Output controller and the remote storage device over at least one of a plurality of physical links; and
      a load balancer to schedule tasks from among the list of tasks by scheduling the data transfer over at least one of the plurality of physical links associated with a connection established between the remote device and the local initiator port, the load balancer to provide a fair share of link servicing to each of a plurality of remote storage devices sharing the plurality of physical links such that each remote storage device receives a fair share of communication bandwidth, the load balancer to maintain a load balancing timeout timer associated with a connection established between the remote storage device and the local initiator port, the load balancer to count frames transferred over the connection and decrement the load balancing timeout timer only while frames are being transferred over the connection, the load balancer to cause the connection to be closed connection when the load balancing timeout timer expires, the load balancer to return a partially completed task to the list of tasks when the load balancing timeout timer expires and there are pending tasks in the list of tasks, the partially completed task to be re-scheduled by the load balancer.

22. The system of claim 21, the load balancer to cause the connection to be closed based on whether the load balancing timeout timer expires or whether a count of frames transferred over the connection before the timer expires exceeds a threshold count, the load balancer to return a partially completed task to the list of tasks when the connection is closed and there are pending tasks in the list of tasks, the partially completed task to be re-scheduled by the load balancer.

* * * * *

UNITED STATES PATENT AND TRADEMARK OFFICE
CERTIFICATE OF CORRECTION

PATENT NO. : 8,447,872 B2  
APPLICATION NO. : 11/591873  
DATED : May 21, 2013  
INVENTOR(S) : Vicky P. Duerk et al.

Page 1 of 1

It is certified that error appears in the above-identified patent and that said Letters Patent is hereby corrected as shown below:

On the title page, References Cited, item (56), in column 2, under "Other Publications", line 11, delete "FBC" and insert -- FCP --, therefor.

On the title page, References Cited, item (56), in column 2, under "Other Publications", line 12, delete "Tio" and insert -- T10 --, therefor.

Signed and Sealed this
Nineteenth Day of August, 2014

Michelle K. Lee
*Deputy Director of the United States Patent and Trademark Office*